United States Patent [19]

Gratzel et al.

[11] 4,381,978

[45] May 3, 1983

[54] PHOTOELECTROCHEMICAL SYSTEM AND A METHOD OF USING THE SAME

[75] Inventors: Michael Gratzel, Corsy; John Kiwi, Preverenges; Kuppuswamy Kalyanasundaram, Chavannes, all of Switzerland; John Philp, Longlevens, England

[73] Assignee: Engelhard Corporation, Iselin, N.J.

[21] Appl. No.: 292,966

[22] Filed: Aug. 14, 1981

Related U.S. Application Data

[63] Continuation of Ser. No. 184,610, Sep. 5, 1980, abandoned.

[30] Foreign Application Priority Data

Sep. 8, 1979 [GB] United Kingdom ................. 7931251
Jul. 8, 1980 [GB] United Kingdom ................. 8022341

[51] Int. Cl.$^3$ .......................... C25B 3/00; C25B 1/10; C25B 1/24
[52] U.S. Cl. ........................................ 204/75; 204/72; 204/128; 204/129; 204/158 R; 204/252; 204/DIG. 3; 429/111
[58] Field of Search ................... 204/72, 75, 128, 129, 204/158 R, 252, 247, 258, DIG. 3, 157.1 R; 429/111

[56] References Cited

U.S. PATENT DOCUMENTS 4,045,315  8/1977  Ryason ..................... 204/157.1 R
4,105,517  8/1978  Ryason ..................... 204/157.1 R
4,211,621  7/1980  Porter ...................... 204/157.1 R
4,215,182  7/1980  Ang et al. ............... 429/15
4,219,392  8/1980  Halmann ................. 204/72

OTHER PUBLICATIONS

F. R. Fan et al., "Semiconductor Electrodes 27, The p- and n-GaAs-N,N'-Dimethyl-4,4' Bipyridinium System", *J. Am. Chem. Soc.* vol. 102, pp. 1488–1492 (1980).
A. J. Bard, "Photoelectrochemistry", *Science*, vol. 207, pp. 139–144 (1980).
R. Memming, "Solar Energy Conversion by Photoelectrochemical Processes," *Electrochimica Acta*, vol. 25, pp. 77–88 (1980).
*Chemical & Engineering News*, Nov. 17, 1980, pp. 61–62.

*Primary Examiner*—Aaron Weisstuch

[57] ABSTRACT

A photoelectrochemical system for conducting endoergic chemical processes driven by light energy. This system consists essentially of an illuminated halfcell and a darkened halfcell joined via electrodes and an external circuit to allow for the transport of electrons. Also, the said halfcells are joined by an ion conducting junction so as to allow for the transport of ions. The illuminated halfcell contains a photosensitizer, an electron relay substance and a catalyst, and the darkened halfcell may contain a second electron relay and a catalyst. Illumination with visible light results in the simultaneous and separate generation of oxidation and reduction products.

22 Claims, 2 Drawing Figures

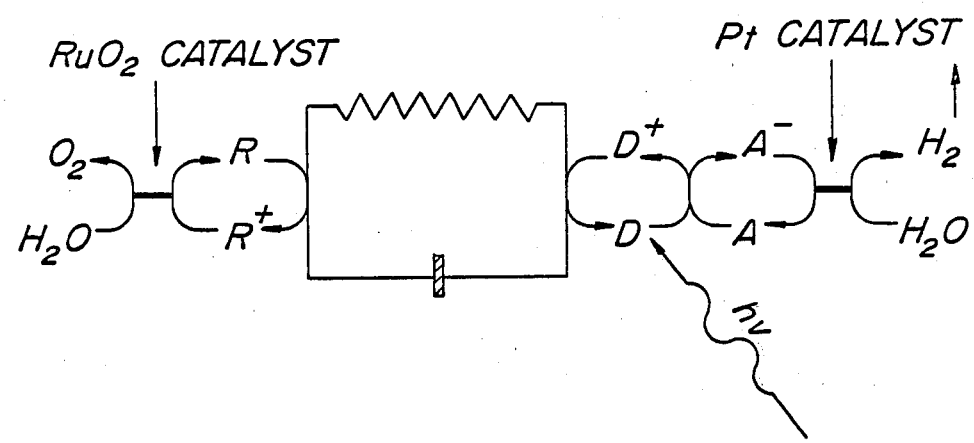
FIG. IA
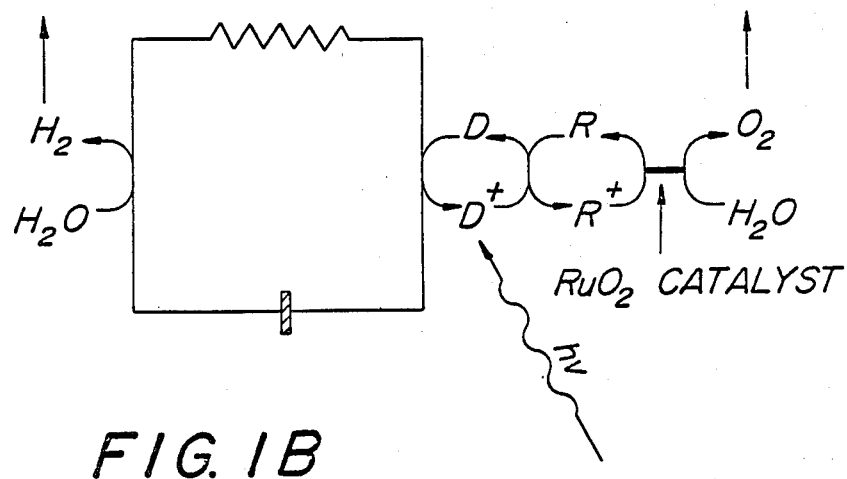
FIG. IB

PHOTOELECTROCHEMICAL SYSTEM AND A METHOD OF USING THE SAME

This is a continuation of application Ser. No. 184,610 filed Sept. 5, 1980, abandoned.

This invention relates to a photochemical system for producing energy-storing compounds by the action of visible light.

This system is comprised of two halfcells, one of which is illuminated. In one of the halfcells a reduction process is carried out, while in the other an oxidation process takes place. These two halfcells are joined via electrodes and an external circuit and an ion conducting junction.

The light is absorbed by a chromophore which is either dissolved in solution or adsorbed on an electrode surface. This distinguishes the system from semi-conductor devices where a semi-conducting material interacts with radiation directly.

Also, this system is distinguishable from devices in which solar radiation is converted to electric power either in photogalvanic or photovoltaic processes and in which the electrical energy can be used to effect chemical transformations.

By suitable design of the light induced electron transfer events, certain substrates can be converted into compounds which produce energy on demand. One such transfer involves the conversion of water into hydrogen and oxygen.

The photolytic generation of hydrogen and oxygen by visible light can provide an unlimited supply of usable fuel from an almost inexhaustible source. Accordingly, much attention has been directed to the storage of solar energy in chemical form.

BACKGROUND

Earlier studies were directed to developing sacrificial acceptor-donor systems for producing hydrogen and/or oxygen from water via visible light irradiation. Redox catalysts were developed which have the effect of mediating water reduction and oxidation.

Later, two types of catalysts were combined to render unnecessary the utilization of sacrificial acceptors and donors. The advantage of this system is its simplicity. Apart from the sensitizer and the two catalysts, the system contains only one other component, namely, an electron relay substance.

However, the simultaneous production of gaseous products such as hydrogen and oxygen gives rise to the problem of separating one from the other in a practical and convenient manner.

THE INVENTION

In accordance with the present invention, there is provided a photochemical reactor for the production of oxidation and reduction products, comprising an illuminated halfcell and a darkened halfcell, each of which contains an electrode. The illuminated halfcell contains a photosensitizer which absorbs visible light, an electron relay substance, a catalyst for mediating an oxidation-reduction process and an oxidizable or reducible substrate material. Means are provided for irradiating the contents of the illuminated halfcell with visible light to drive an endoergic reaction for converting the substance material into oxidation or reduction products. The darkened halfcell contains a catalyst for mediating an oxidation-reduction process. There is also provided means for transporting electrons and ions between the illuminated halfcell and the darkened halfcell via an electrically conductive element joining the electrodes and an ion conducting junction, respectively.

The reactor in a preferred mode of construction includes means for recovering the oxidation and reduction products in their respective halfcells; the ion conducting junction may be a solid polymeric cation conducting membrane, such as, for example, a membrane comprised of perfluorosulfonic acid polymer; the electrode in either or both halfcells may be platinum.

The present invention also provides a method for the endoergic production of oxidation and reduction products from a substrate material, which method comprises the following steps: (a) irradiating with visible light an aqueous mixture in a halfcell containing (i) a substrate material, (ii) a photosensitizer which absorbs visible light, (iii) an electron relay substance, one of elements (ii) or (iii) functioning as an electron donor and the other of which functioning as an electron acceptor, and (iv) an electrode; (b) mediating with a catalyst the oxidation-reduction process in the illuminated halfcell; (c) maintaining a darkened halfcell which contains a substrate material and an electrode; (d) mediating with a catalyst the oxidation-reduction process in the darkened halfcell; and (e) simultaneously transporting electrons and ions between the illuminated halfcell and the darkened halfcell via an electrically conductive element joining the electrodes and an ion conducting junction, respectively, and (f) recovering the oxidation and reduction products.

One aspect of the invention includes producing the reduction product in the illuminated halfcell and the oxidized product in the darkened halfcell, whereas another aspect of the invention includes producing the oxidation product in the illuminated halfcell and the reduction product in the darkened halfcell.

In the method and apparatus of the invention hereinafter described, the "darkened" halfcell is the one which is not necessarily subjected to visible light irradiation. However, the apparatus may be operated with the darkened halfcell irradiated as well as the illuminated or illuminatable halfcell, or with the darkened halfcell under ambient conditions, that is, the darkened halfcell may be exposed to room or atmospheric light. Alternatively, the darkened halfcell may be made light-impermeable by shielding it from visible light rays via the use of a cover or other known means.

The object of this invention is to provide a catalyst mediated system through which energy losses in the reaction are minimized and high quantum photochemical yields are achieved. This system involves a photochemical means for producing storable energy from chemical compounds by interaction with visible light.

One object of this invention is the photodissociation of water into hydrogen and oxygen, whereby both gases are separately and simultaneously generated.

Another object is the photolytic dissociation of hydrogen halides such as hydrogen chloride, hydrogen iodide and hydrogen bromide into hydrogen gas and the respective halogens in gaseous form.

Still another object is the photoinduced reaction of water and carbon dioxide to a formate and oxygen.

Yet another object is the reduction of nicotinamide adenine dinucleotide ($NAD^+$) to its reduced form (NADH).

These processes are characterized by their highly endoergic nature; accordingly, they provide systems with a high energy storing capacity. Moreover, some of the products obtainable via this invention are useful materials currently produced in energy consuming processes.

A more detailed description of these embodiments is set forth below.

FIGS. 1(a) and 1(b) are schematic representations of devices which fulfill the objective of the decomposition of water into hydrogen and oxygen. These schematics illustrate the general principle. They are not limited to a precise design but are intended to include modifications thereof. Such modification may include, for example, the elimination of one or more of the illustrated components so as to provide a more simplified design and method of operation.

The device of FIGS. 1(a) and 1(b) consists of two halfcells, one for reduction (hydrogen production) and the other for oxidation (oxygen production). Conductance is achieved via electrodes which extend into both halfcells. These electrodes are connected by a conductive element. The halfcells are also coupled via an ion conducting junction such as an ion conducting membrane.

FIG. 1(a) illustrates an instance where the hydrogen-producing halfcell is illuminated and the oxygen-producing halfcell operates in the absence of light.

In the right halfcell a photosensitizer (D) absorbs visible light, thereby driving a redox process in which the electron relay A is reduced to $A^-$ with concomitant oxidation of D to $D^+$. Subsequently, the reduced electron relay $A^-$ releases hydrogen from water under the oxidation to A in a catalyst mediated process. The reductant R in the left halfcell provides electrons via the external circuit to reduce $D^+$ back to D.

In a subsequent thermal reaction mediated by a redox catalyst, $R^+$ is reconverted to R under simultaneous oxygen evolution. By the suitable choice of a catalytic electrode, the use of a reductant (R) and a separate catalyst can be avoided.

The protons generated in the oxygen-producing halfcell diffuse across the ion conducting junction and neutralize the hydroxyl ions which are formed in the hydrogen-producing halfcell. It should be noted that in this device only four quanta of visible light instead of eight are consumed in the production of one oxygen molecule. Such a process can be achieved only if the catalytic oxygen evolution occurs with minimal loss of energy, i.e., close to the equilibrium potention of 0.82 at neutral pH. The performance of such a halfcell is discussed more completely in the Specific Embodiments below.

An alternative cell design for the production of hydrogen and oxygen is shown in FIG. 1(b).

This device distinguishes itself by the fact that the oxygen-producing halfcell is irradiated, hydrogen being produced in a dark reaction.

The oxygen-producing halfcell contains a sensitizer $D^+$ whose excited state redox potential is more negative than that required for hydrogen evolution ($E° = -0.43$ V in neutral water).

This half cell also contains a electron relay reductant R and a catalyst suitable for mediating oxygen generation from water.

Upon excitation, light absorption by $D^+$ produces an excited state which is capable of extracting an electron from the electron relay reductant R:

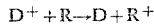

The reduced species D injects an electron into the external circuit and this acts to reduce water to hydrogen in the other halfcell.

The regeneration of R from $R^+$ occurs through the oxidation of water to oxygen, this process being mediated by a catalyst.

It should be noted that either of the electron relays ($R/R^+$ and $A/A^-$) could function as the light absorbing species.

Further embodiments of this invention relate to modifications which may be effected to simplify the operations of the cell systems described in FIG. 1. Thus, for example, where the hydrogen-producing halfcell is illuminated (FIG. 1(a)), the sensitizer D may be such that it is adsorbed on the surface of the electrode. Under these circumstances the hydrogen production which results from the reaction of the reduced electron relay with water may be mediated by the electrode surface itself. Thus, the addition of a redox catalyst may be avoided.

Another simplified version of the device in FIG. 1(b) utilizes the electrode material as a catalyst in the oxygen generation step. As a result, the addition of an extraneous catalyst is unnecessary. Moreover, in this version the sensitizer D is adsorbed on the electrode surface.

In the device of FIG. 1(b) it is also feasible to employ an n-type semiconductor as the electrode material in the oxygen-producing halfcell. In such an instance, the conduction band edge of the semiconductor must be more cathodic than the hydrogen evolution potential. Irradiation of the sensitizer generates an excited species capable of injecting an electron into the conduction band of the semiconductor with simultaneous oxidation of the sensitizer. The electron migrates to the other halfcell where it is used to produce hydrogen from the water, while oxygen is produced directly via the reaction of the oxidized sensitizer with water in the presence of a suitable catalyst. Accordingly, the addition of the reductant R to the oxygen-producing halfcell becomes superfluous.

A device similar to that which is depicted in FIG. 1(a) may also be used to achieve the cyclic photoinduced splitting of hydrogen halides into hydrogen and halogen. In this procedure halide ions are used in lieu of water hydroxyl ions as the electron source in the left cell. A typical acid halide system is illustrated by the use of hydrogen chloride, in which the redox potential for the chlorine/chloride couple ($E° = 1.36$ V) is comparable to that for water oxidation. As in the case of the water-splitting system, the hydrogen-producing halfcell is illuminated to produce oxidized sensitizer molecules $D^+$. In the left cell, the reductant R provides electrons which pass through the external circuit to reconvert $D^+$ into D with a concomitant oxidation of the reductant R to $R^+$. The regeneration of R occurs via a reaction with chloride ions, as illustrated by the following equation.

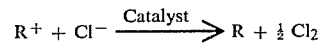

This reaction is mediated by a redox catalyst. Alternatively, halogen production may also occur at a suitable catalytic electrode absent the reductant R and absent an extraneous catalyst.

The oxygen or halogen-producing halfcells described above may be coupled with other halfcells in which the reduction of a substrate material other than water is achieved. For example, it is feasible to reduce carbon dioxide to a formate according to the equation: $CO_2 + H^+ + 2e^- \rightarrow HCOO^-$ where the electrons ($e^-$) are provided either by the reduced electron relay ($A^-$) as depicted in FIG. 1(a) or through the external electrical circuit as depicted in FIG. 1(b). The redox potential of the $CO_2/HCOO^-$ couple is only slightly more negative than that for hydrogen generation thus allowing the cell to perform in a four quantum process. It will thus be appreciated that the substrate material in one half cell may be the same as or different from that in the other halfcell.

The coenzyme $NAD^+$ may also be employed as a starting material in an otherwise similar process. In this conversion $NAD^+$ is reduced to NADH:

$$NAD^+ + H^+ + 2e^- \rightarrow NADH$$

Again, the electrons are provided either by a reduced electron relay ($A^-$) or an external circuit.

NADH is a highly desirable biologic fuel which is of great importance in the food processing industry. The redox potential of $NAD^+$ is slightly more positive than that for water reduction, thus rendering a four quantum process entirely feasible.

SPECIFIC EMBODIMENTS

The following is a more detailed description of the system depicted in FIGS. 1(a) and 1(b).

The sensitizer employed in the hydrogen-producing halfcell of FIG. 1(a) must meet four criteria: (1) it must possess suitable redox potential in its ground and excited states; (2) it must possess the ability to absorb light in a suitable region of the solar spectrum; (3) it must be capable of efficiently reducing the electron relay and (4) it must be chemically stable in the oxidation states of interest.

Sensitizers which meet these criteria include, for example, transition metal complexes such as ruthenium tris bipyridyl cations and ligand substituted ruthenium tris bipyridyl cations, such as ruthenium tris lower alkylbipyridyl cations or other corresponding complexes in which the bipyridyl moiety is replaced by a substituted bipyridyl radical; phenanthroline derivatives; metallo porphyrines and derivatives thereof such as the sulfo porphyrine and pyridinium porphyrines; or metallo phthalocyanines.

Suitable electron relays include, for example, alkyl viologen compounds, bipyridinium derivatives such as 2,2'-bipyridinium and 4,4'-bipyridinium halides as, for example, 1,1-tri-lower alkylene-4,4'-di-lower alkyl-2,2'-dipyridinium dihalides and the like, rhodium tris bipyridyl cations such as $Rh(bipy)_3^{+3}$, europic, chromic and vanadic ions and the salicylate complexes thereof or cobaltous ammines and the macrocyclic derivatives thereof.

In those instances where the electron relay functions as a photosensitizer, acridine dyes such as proflavine and acridine orange may be utilized. In such systems, suitable donors include, for example, dipyranyl, dithiopyranyl or thiofulvalenes and the like.

Suitable catalysts for mediating hydrogen production from water include, for example, platinum, palladium, rhodium, ruthenium and iridium.

In the oxygen halfcell of FIG. 1(a), other materials suitable for use as an electron relay are ferrous tris bipyridyl cations, $Fe(bipy)_3^{+2}$, ruthenium tris bipyridyl cations, $Ru(bipy)_3^{+2}$, ferrous phenanthroline cations, osmium tris bipyridyl cations, osmium tris phenanthroline cations and porphyrines.

Suitable catalysts for mediating oxygen production include, for example, the oxides of ruthenium, platinum and iridium or transition metal species such as the oxides, hydroxides and hydrated oxides of titanium, manganese, iron and nickel including combinations thereof.

The electrodes are essentially inert conductive elements of the type generally employed in electrolytic and electrochemical processes. Precious metals such as platinum or palladium and the like may be employed for this purpose or, alternatively, the said electrodes may comprise a conductive base which is coated on the outside with a film of one or more metal oxides.

The base of the electrode should be essentially resistant to the reaction medium. Suitable base metals include, for example, iron, titanium, aluminum, tungsten, nickel or the like.

The metal coating may comprise a mixture of a metal with the oxide of said metal or a mixture of two metals or combinations of several metals with metal oxides. Suitable metals which may be employed per se or in their oxide form include, for example, silver, gold, platinum, palladium, iridium, ruthenium and nickel or the like. The thickness of the coating or film-forming layer on the conductive base may vary over a wide range. According to one embodiment, a 2 $\mu m$ layer of said coating on a 0.3 mm thick plate of conductive base provided an electrode which functioned most suitably in the process of this invention.

EXAMPLE 1

Simultaneous Production of Oxygen and Hydrogen from Water

The oxygen producing halfcell contains a $10^{-3}$ aqueous solution of ferrous tris-bipyridyl perchlorate buffered to pH 7 and 30 mg per 100 ml of hydrated ruthenium dioxide powder.

The hydrogen producing halfcell contains $5 \times 10^{-3}$ M methylviologen as an electron relay. The hydrophobic ruthenium complex $Ru(ipbipy)_3^{+2}.2\ Cl^-$, where (ipbipy) is the isopropyl ester of 4,4'-bipyridyldicarboxylic acid, is used as the sensitizer at a concentration of $10^{-5}$ M. The cell is buffered at pH 4.7 with sodium acetate-acetic acid buffer. A major amount of the sensitizer is adsorbed on the electrode surface. To the reaction mixture is added a colloidal platinum catalyst stabilized by centrifuged polyvinyl alcohol (MW 60,000) at a concentration of 30 mg per 100 ml of solution.

The electrodes in both halfcells are comprised of platinum. A NAFION ® membrane is used as the ion conducting junction.

Upon illuminating the hydrogen producing halfcell with a 150 watt slide projector lamp, a current of 20–40 $\mu A$ is observed. The products of the cell reaction are oxygen in the darkened halfcell and hydrogen in the illuminated halfcell. The rate of evolution of these gases corresponds to the electrochemical equivalent of the current generated in the circuit.

EXAMPLE 2

Simultaneous Production of Hydrogen and Oxygen from Water

The oxygen producing halfcell contains 0.1 N $H_2SO_4$ and an electrode comprising a 2 $\mu M$ layer of ruthenium oxide on a 0.3 mm thick plate of titanium having a total surface area of 8 cm$^2$.

The hydrogen producing halfcell contains a solution in 0.1 N $H_2SO_4$ of methylviologen ($5 \times 10^{-3}$ M) as an electron relay and $Ru(bipy)_3^{+2}$ 2 $Cl^-$ ($10^{-4}$ M) as a sensitizer. The catalyst is 20 mg/liter of finely divided platinum (25-35 Å diameter) stabilized by 40 mg/liter of Carbowax 20 M ®. The electrode in this halfcell is platinum gauze.

A NAFION ® membrane is used as the ion conducting junction between the two halfcells.

Upon illuminating the hydrogen producing halfcell with a 150 watt slide projector lamp, a current of 200 μA is observed. The products of the cell reaction are shown to be oxygen in the dark halfcell and hydrogen in the illuminated halfcell. The rate of evolution of the gases corresponds to the electrochemical equivalent of the current generated.

EXAMPLE 3

Simultaneous Production of Chlorine and Hydrogen from Hydrochloric Acid

The chlorine producing halfcell contains 1 M HCl and an electrode comprising a 2 μm layer of ruthenium oxide on a 0.3 mm thick titanium plate having a total surface area of 8 cm$^2$.

The hydrogen producing halfcell contains a solution of 1 N HCl of methylviologen ($5 \times 10^{-3}$ M) serving as an electron relay and $Ru(bipy)_3^{+2}$ 2 $Cl^-$ ($10^{-4}$ M) as a sensitizer. The catalyst is finely divided platinum (20 mg/liter) having a diameter size in the range of 25-30 Å stabilized with 40 mg/liter of Carbowax 20 M ®. The electrode in this halfcell is platinum gauze.

A NAFION ® membrane is used as the ion conducting junction between the halfcells.

Upon illuminating the hydrogen producing halfcell with a 150 watt slide projector lamp, a cell current of 150 μA is observed. Products of the cell reaction are shown to be chlorine in the dark halfcell and hydrogen in the illuminated halfcell. The rates of evolution for these two gases correspond essentially to the electrochemical equivalent of the current generated.

EXAMPLE 4

Simultaneous Production of Bromine and Hydrogen from Hydrogen Bromide

The procedure of Example 3 is followed except that the hydrochloric acid in the two halfcells is replaced by 1 M hydrobromic acid.

Upon illuminating the hydrogen producing halfcell with a 150 watt slide projector lamp, a cell current of 1.2 mA is observed. Products of the cell reaction are shown to be bromine in the dark halfcell and hydrogen in the illuminated halfcell. The rates of evolution of these gases correspond to the electrochemical equivalent of the current generated.

EXAMPLE 5

Simultaneous Production of Oxygen and Hydrogen from Water

The hydrogen producing halfcell contains $10^{-2}$ N $H_2SO_4$.

The oxygen producing halfcell contains a solution in $10^{-2}$ N $H_2SO_4$ of $Ru(bipy)_3^{+2}$ 2 Cl serving as a sensitizer and tetradecylmethylviologen ($2 \times 10^{-3}$ M) as an electron relay. Colloidal ruthenium dioxide (30 mg/liter) stabilized with N-methylpolyvinylpyridine (60 mg/liter) serves as a catalyst.

The electrodes in both halfcells are comprised of platinum.

A NAFION ® membrane is used as the ion conducting junction.

Upon illumination of the oxygen producing halfcell with a 150 watt slide projector lamp, the potential at the anode rises to +1050 mV (vs saturated calomel) with a concomitant increase of cell current to 350-400 μA.

Products of the cell reaction are hydrogen in the dark halfcell and oxygen in the illuminated halfcell. The rate of evolution of these gases corresponds to the electrochemical equivalent of the current generated.

EXAMPLE 6

Simultaneous Production of Formate and Oxygen from Carbon Dioxide and Water

The oxygen producing halfcell contains an aqueous solution buffered at pH 4.7 and an electrode comprising a 2 μm layer of ruthenium dioxide on a 0.3 mm thick titanium plate having a total surface area of 8 cm$^2$. The formate producing halfcell contains an aqueous solution of $Ru(bipy)_3^{+2}$ 2 $Cl^-$ ($10^{-4}$ M) serving as a sensitizer and 1,1-trimethylene-4,4'-dimethyl-2,2'-dipyridynium dibromide ($2 \times 10^{-3}$ M) as a relay buffered to pH 4.7. The catalyst is finely divided platinum (25-35 Å) stabilized with Carbowax 20 M ® employed at a concentration of 40 mg/liter. The electrode in this halfcell is platinum gauze.

A NAFION ® membrane is used as the ion conducting junction between the two halfcells.

Carbon dioxide is bubbled through the formate producing halfcell at a rate of 2-3 liters/hr and this halfcell is illuminated with a 150 watt slide projector lamp.

The formate produced is analyzed by gas chromatography after conversion to butylformate. Increasing formate formation is a function of irradiation time. Thus, 1.2 millimoles of butylformate are formed after 3 hours; 1.8 millimoles are formed after 5 hours and 2.5 millimoles are formed after 7 hours of irradiation.

Simultaneous and sustained oxygen evolution from the non-illuminated halfcell is observed.

What is claimed is:

1. A photochemical reactor for the production of oxidation and reduction products, comprising an illuminatable halfcell and a darkenable halfcell, each of which contains an electrode; said illuminatable halfcell containing a photosensitizer which absorbs visible light, an electron relay substance, a catalyst for mediating an oxidation-reduction process and an oxidizable or reducible substrate material; means for irradiating the contents of said illuminatable halfcell with visible light to drive an endoergic reaction for converting said substrate material into oxidation or reduction products; and the darkenable halfcell containing a catalyst for mediating an oxidation-reduction process; and means for transporting electrons and ions between said illuminatable halfcell and said darkenable halfcell via an electrically conductive element joining the electrodes and an ion conducting junction, respectively.

2. The reactor of claim 1 in which the darkenable halfcell further comprises an electron relay substance selected from among ferrous tris bipyridyl cations, ruthenium tris bipyridyl cations, ferrous phenanthroline cations, osmium tris bipyridyl cations, osmium tris phenanthroline cations and porphyrines.

3. The reactor of claim 1 wherein means are provided for recovering the oxidation and reduction products from their respective halfcells.

4. The reactor of claim 1 wherein the ion conducting junction is a solid polymeric cation conducting membrane.

5. The reactor of claim 1 wherein the ion conducting junction is a cation-conducting membrane comprised of perfluorosulfonic acid polymer.

6. The reactor of claim 1 wherein the electrode in either or both halfcells is platinum.

7. A method for the endoergic production of oxidation and reduction products from at least one substrate material which comprises (a) irradiating with visible light an aqueous mixture in a halfcell containing (i) a said substrate material, (ii) a photosensitizer which absorbs visible light, (iii) an electron relay substance, one of elements (ii) or (iii) functioning as an electron donor and the other of which functioning as an electron acceptor, and (iv) an electrode; (b) mediating with a catalyst the oxidation-reduction process of said substrate material in said illuminated halfcell; (c) maintaining a darkened halfcell which contains a said substrate material which may be the same as or different from that in said illuminated halfcell, and an electrode; (d) mediating with a catalyst the oxidation-reduction process of said last mentioned substrate material in said darkened halfcell; (e) simultaneously transporting electrons and ions between said illuminated halfcell and said darkened halfcell via an electrically conductive element joining said electrodes and an ion conducting junction, respectively, and (f) recovering the oxidation and reduction products.

8. The method of claim 7 in which the reduction product is produced in the illuminated halfcell and the oxidized product is produced in the darkened halfcell.

9. The method of claim 7 in which the oxidation product is produced in the illuminated halfcell and the reduction product is produced in the darkened halfcell.

10. The method of claim 7 in which said photosensitizer is selected from among ruthenium tris bipyridyl cation, ruthenium tris substituted bipyridyl cation, phenanthrolines, metallo porphyrines, sulfo porphyrines, pyridinium porphrines and metallo phthalocyanines.

11. The method of claim 7 in which the electron relay in the illuminated halfcell is selected from among alkyl-viologens; 2,2'-bipyridinium cations; 4,4'-bipyridinium cations; rhodium tris bipyridyl cations; europic, chromic and vanadic ions, and the salicylate complexes thereof; or cobaltous ammines and the macrocyclic derivatives thereof.

12. The method of claim 7 in which the catalyst in the illuminated halfcell is selected from among platinum, palladium, rhodium, ruthenium and iridium.

13. The method of claim 7 in which the darkened halfcell further comprises an electron relay substance selected from among ferrous tris bipyridyl cations, ruthenium tris bipyridyl cations, ferrous phenanthroline cations, osmium tris bipyridyl cations, osmium tris phenanthroline cations and porphyrines.

14. A method according to claim 7 for the simultaneous production of hydrogen and oxygen from water wherein the electrodes in the illuminated halfcell and the darkened halfcell are platinum; the said illuminated halfcell contains ruthenium tris isopropyl bipyridinium cation, methylviologen, a platinum catalyst and water; and said darkened halfcell contains a powdered oxidation catalyst.

15. The method according to claim 14 wherein the catalyst in the illuminated halfcell is colloidal platinum.

16. The method according to claim 14 wherein the catalyst in the darkened halfcell is powdered ruthenium dioxide in combination with ferrous tris bipyridyl cation electron relay.

17. The method according to claim 14 wherein the production of oxygen is mediated by the addition of a catalyst selected from the group consisting of oxides of ruthenium, platinum and iridium and the oxides, hydroxides and hydrated oxides of titanium, manganese, iron and nickel and mixtures thereof.

18. The method according to claim 7 wherein said at least one substrate material comprises an aqueous solution of a hydrogen halide and the oxidation and reduction products are hydrogen and halogen.

19. The method according to claim 18 wherein the hydrogen halide is hydrogen chloride and the oxidation and reduction products are hydrogen and chlorine.

20. The method according to claim 18 wherein the hydrogen halide is hydrogen bromide and the oxidation and reduction products are hydrogen and bromine.

21. The method according to claim 7 wherein said at least one substrate material comprises carbon dioxide in water and the oxidation and reduction products are formate and oxygen.

22. The method according to claim 7 for the simultaneous production of hydrogen and oxygen from water wherein the electrodes in the illuminated halfcell and the darkened halfcell are platinum; and the illuminated halfcell contains ruthenium tris bipyridyl cation, tetradecylmethylviologen, a colloidal ruthenium dioxide catalyst and water.

* * * * *